United States Patent Office 3,414,770
Patented Dec. 3, 1968

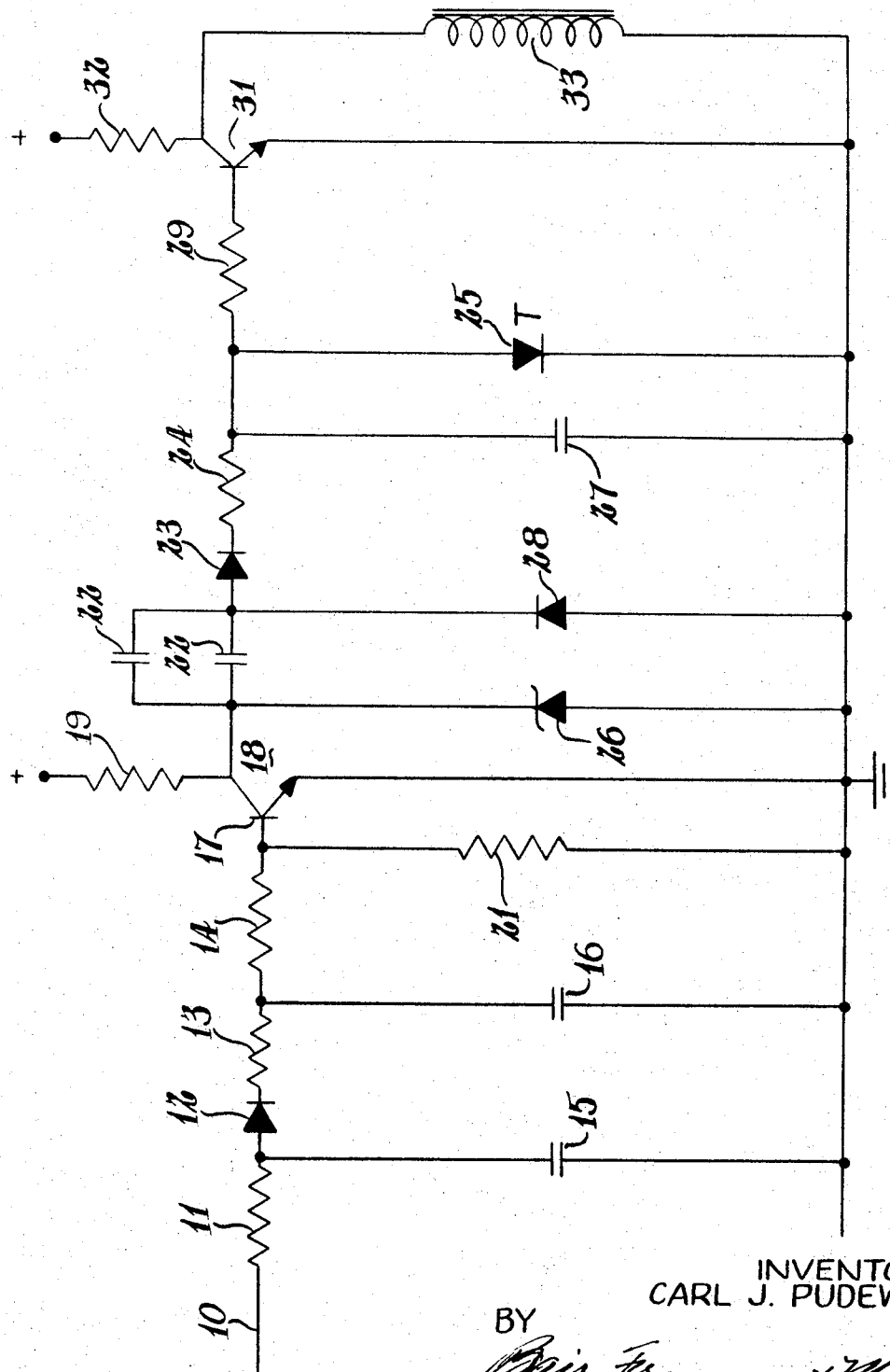

3,414,770
SPEED CONTROL APPARATUS
Carl J. Pudewill, Chicago, Ill., assignor to Sun Electric Corporation, a corporation of Delaware
Filed May 17, 1965, Ser. No. 456,375
1 Claim. (Cl. 317—5)

ABSTRACT OF THE DISCLOSURE

A circuit for monitoring a pulse train having a pulse repetition rate which is proportional to a speed to be measured. A standardized pulse is applied to the parallel combination of a charge accumulating capacitor and a tunnel diode each time a pulse occurs. The tunnel diode, which is connected to discharge the capacitor, exhibits an abrupt increase in resistance when the current flowing there through exceeds a predetermined value. Increases in the pulse repetition frequency increases the net current flow through the tunnel diode, causing it to abruptly increase in resistance at a predetermined frequency and provide an output indication.

Background and summary of the invention

This invention relates to speed control aparatus and more particularly to electric apparatus responsive to a speed to be measured to produce indicating or control operations when a predetermined speed condition exists.

In the operation of many types of apparatus, such as electric motors, internal combustion engines or other rotary devices, as well as linearly moving or oscillating devices, it becomes desirable to effect either an underspeed control, an over-speed control or an indicating or control function at a predetermined speed.

Apparatus heretofore available for these purposes has been in the nature of mechanically operated governors or similar mechanical devices which are relatively complex and which are difficult to maintain in accurate adjustment.

It is accordingly one of the objects of the present invention to provide a speed control apparatus which is entirely electrical so that it is relatively simple and compact and is easy to maintain in accurate adjustment.

Another object is to provide speed control apparatus in which a series of electrical pulses proportionate to the speed to be measured are transmitted to a tunnel diode or similar device whose resistance changes at a predetermined current flow and which changes a characteristic of the circuit to effect a control or indicating operation.

According to a feature of the invention, pulses proportionate to the speed to be measured trigger a transistor or similar electrical valve which discharges a capacitor, with the capacitor being charged to a predetermined voltage through a tunnel diode and with a second transistor being triggered to effect an indicating or control function in response to a voltage in the circuit which changes when the resistance of the tunnel diode changes.

The above and other objects and features of the invention will be more readily apparent from the following description when read in connection with the accompanying drawing in which the single FIGURE is a circuit diagram of speed control apparatus embodying the invention.

As shown in the drawing, electrical pulses proportionate to a speed to be measured are supplied to an input terminal 10 of the circuit, the other side of the pulse source being connected to a ground which is common to the circuit. The pulses may be derived in any desired manner depending upon the apparatus whose speed is to be indicated. For example, rotating devices may drive alternators, generators, or the like to produce alternating or pulsating current or the rotation thereof, or movement of linearly moving, or oscillating devices may be detected by photoelectric cells, or mechanically operated switches which will produce a series of pulses whose frequency is proportional to the speed of the apparatus.

The input terminal 10 is connected through the resistor 11, a rectifier 12 and a filtering circuit, including resistors 13 and 14, and capacitors 15 and 16 to the base 17 of a transistor 18. The collector of the transistor 18 is connected through a load resistor 19 to a source of positive D.C. voltage and the emitter is connected to ground as shown. The base of the transistor may also be connected to ground through a load resistor 21.

The collector of the transistor 18 is connected to one side of one or more capacitors 22, the other side of which is connected through a rectifier 23, a resistor 24 and a tunnel diode 25 to ground. The circuit just described constitutes the charging circuit for the capacitors 22. A Zener diode 26 is preferably connected between the collector of transistor 18 and ground to limit the charging voltage of the capacitor 22 to a predetermined value so that each charging pulse which passes through the tunnel diode 25 will be of the same value. A relatively large capacitor 27 is preferably connected in parallel with the tunnel diode to filter out sharp fluctuations and to smooth the flow of current through the diode.

The capacitors 22 are discharging through the transistor 18 when it is conducting and through a rectifier 28 connected between ground and the side of the capacitor opposite to the transistor collector. It will be noted that the rectifier 28 is so poled that it will not conduct during charging of the capacitors.

The common point between resistor 24 and the tunnel diode 25 is connected through a resistor 29 to the base of a transistor 31. The collector of this transistor is connected through a load resistor 32 to a source of positive D.C. voltage and the emitter is connected directly to ground. A control device such as relay coil 33 is connected between the collector of transistor 32 and ground to receive a control pulse when the transistor 31 is triggered into conduction. As shown, the relay coil 33 is energized through the resistor 32 when the transistor 31 is not conducting but is shunted by the transistor 31 when it is conducting. It will be apparent that, if desired, this operation could be reversed to energize the relay when the transistor is conducting and to deenergize it when the transistor is nonconducting.

Description of the preferred embodiment

In operation when the the transistor 18 is nonconducting the capaictors 22 will be charged through the resistor 19, rectifier 23, resistor 24 and tunnel diode 25. When the transistor 18 receives a pulse and is triggered into conduction, the capacitors 22 will discharge through the transistor 18 and rectifier 28. The tunnel diode will therefore carry a current which is proportional to the frequency of the pulses received at the terminal 10.

When the pulses are at a relatively low frequency, indicating a relatively low speed, the current passing the tunnel diode will be small and the tunnel diode will offer a low resistance to its flow. As the frequency of the pulses increases, the current through the tunnel diode will increase proportionately until it reaches its triggering value at which time its resistance will increase substantially. This will cause an increase in the voltage applied to the base of transistor 31 to trigger it into conduction thereby to produce a control impulse in the coil 33 which can utilized to effect an indicating or control operation. It will be seen that the circuit can be utilized to effect an under-speed control to produce a control impulse when the speed is below a predetermined value, an over-speed control to produce a control impulse when the speed exceeds a predetermined value, or to produce a control impulse at any predetermined speed. The speed at which the control impulses will be produced can be regulated by selection of the tunnel diode 25 and by increasing or decreasing the value of the capacitors 22.

While one embodiment of the invention has been shown and described in detail, it will be understood that this is for the purpose of illustration only and is not to be taken as a definition of the scope of the invention, reference being had for this purpose to the appended claim.

What is claimed is:

1. An arrangement for monitoring a train of periodic signal pulses having a varying repetition rate and for providing an output indication whenever said repetition rate exceeds a predetermined value, said arrangement comprising, in combination, the parallel combination of an accumulating capacitor and a tunnel diode, said tunnel diode being poled to discharge said capacitor and being characterized by an abrupt increase in resistance whenever current flowing therethrough reaches a specified value, an electronic switching device connected in series with a load resistor across a D.C. voltage source, a second capacitor and a second diode connected in series across said switching device, said second diode being poled to discharge said second capacitor when said switching device is in a conductive state, circuit means connecting a third diode between said second diode and said accumulating capacitor, said third diode being poled to prevent the discharge of said accumulating capacitor through said switching device and said load resistor, means for alternately switching said switching device on and off in response to said train of pulses such that a standardized electrical pulse is applied to said parallel combination whenever one of said input pulses occurs, said electrical pulses tending to charge said accumulating capacitor, and switching means responsive to said abrupt resistance increase for providing an output indication.

References Cited
UNITED STATES PATENTS

| | | | |
|---|---|---|---|
| 2,994,063 | 7/1961 | Gibson | 317—148.5 |
| 3,094,631 | 6/1963 | Davis | 307—88.5 |
| 3,149,243 | 9/1964 | Garfield | 307—88.5 |
| 3,267,296 | 8/1966 | Fuss | 307—88.5 |
| 3,277,307 | 10/1966 | Smeton, et al. | 307—88.5 |
| 3,299,295 | 1/1967 | Goda | 307—88.5 |

LEE T. HIX, *Primary Examiner.*